US012205561B2

(12) United States Patent
Martin

(10) Patent No.: US 12,205,561 B2
(45) Date of Patent: Jan. 21, 2025

(54) PERCUSSION MUSICAL INSTRUMENT

(71) Applicant: Milo Martin, Los Angeles, CA (US)

(72) Inventor: Milo Martin, Los Angeles, CA (US)

( * ) Notice: Subject to any disclaimer, the term of this patent is extended or adjusted under 35 U.S.C. 154(b) by 161 days.

(21) Appl. No.: 18/302,249

(22) Filed: Apr. 18, 2023

(65) Prior Publication Data

US 2023/0343307 A1 Oct. 26, 2023

Related U.S. Application Data

(60) Provisional application No. 63/332,846, filed on Apr. 20, 2022.

(51) Int. Cl.
*G10D 13/08* (2020.01)
*G10D 13/24* (2020.01)
*G10G 5/00* (2006.01)

(52) U.S. Cl.
CPC ............. *G10D 13/08* (2013.01); *G10D 13/24* (2020.02); *G10G 5/005* (2013.01)

(58) Field of Classification Search
CPC ......... G10D 13/08; G10D 13/24; G10G 5/005
See application file for complete search history.

(56) References Cited

U.S. PATENT DOCUMENTS

| | | | | |
|---|---|---|---|---|
| 8,735,703 | B2 * | 5/2014 | Dublin | G10D 13/02 84/411 R |
| 9,466,273 | B2 * | 10/2016 | Krol | G10D 13/20 |
| 2006/0027071 | A1 * | 2/2006 | Barnett | G10D 13/08 84/402 |
| 2013/0177174 | A1 * | 7/2013 | Pires | G10D 13/06 381/118 |
| 2019/0189095 | A1 * | 6/2019 | Cooke | G10D 13/08 |
| 2023/0343307 | A1 * | 10/2023 | Martin | G10D 13/24 |

* cited by examiner

*Primary Examiner* — Robert W Horn
(74) *Attorney, Agent, or Firm* — Vierra Magen Marcus LLP

(57) ABSTRACT

The XILO Cube is a percussion instrument based on the classic Euclidean (hexahedronic) open-sided cube. Manufactured of lightweight metal, each edge/side of the cube contains a different note and/or tone giving it 24 (twenty-four) playing surfaces. All edges are spot-welded.

20 Claims, 3 Drawing Sheets

TONES CONFIGURED IN 4ths.

PIANO SEGMENTS = 1 – 2 – 1/2 – 3 – 2/3 – 4 – 3/4 – 4/1

PERCUSSION MUSICAL INSTRUMENT

This application claims the benefit of Provisional Application Ser. No. 63/332,846 filed on Apr. 20, 2022, titled "Percussion Musical Instrument," incorporated herein by reference in its entirety.

BACKGROUND

The present disclosure relates to percussion musical instruments.

SUMMARY

The XILO Cube is a percussion instrument based on the classic Euclidean (hexahedron) open-sided three dimensional cube. Manufactured of lightweight metal, each edge/side of the cube contains a different note and/or tone giving it 24 (twenty-four) playing surfaces. All edges are spot-welded.

DETAILED DESCRIPTION

Figure 1:
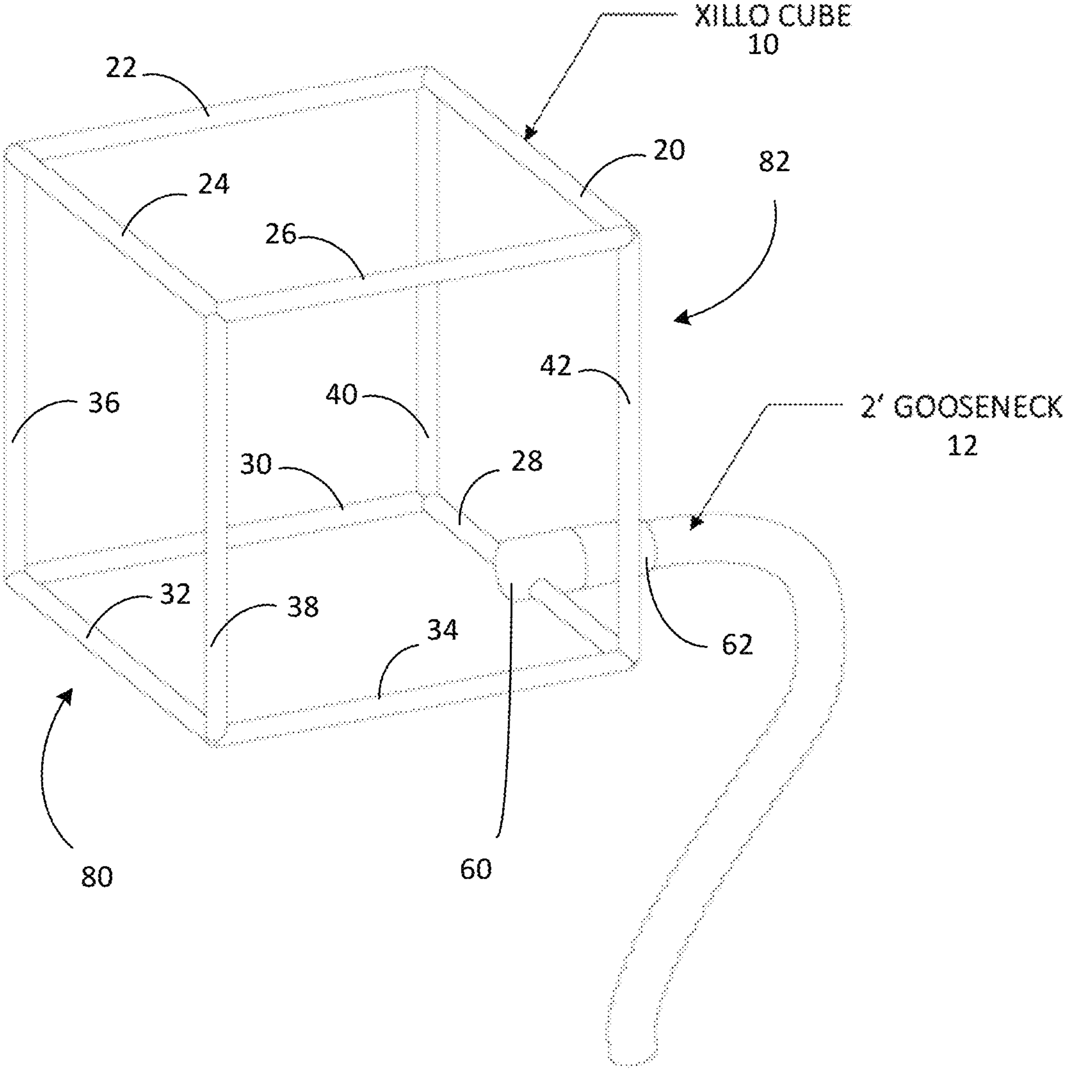
FIG. 1 depicts the XILO cube connected to a stand.

A traditional metal musical triangle includes the same tones and notes on all three sides. The proposed XILO cube is a metal musical cube with different notes on all sides. A user is able to create single notes, double notes, triplets, and quadruplets. The XILO cube is played with drumsticks or mallets or any striking type of weapon, using all different textures, tones, and notes.

First imagine a square with different notes on all sides. then imagine another square attached behind the frontal square to comprise a Euclidean Cube or Hexahedron, providing yet four more surfaces creating a total of eight different surfaces with eight different tones or notes in an inter-dimensional configuration. Double/simultaneous quadruplets. If we conjoin the frontal and posterior squares with edges up top and down below on the horizontal plane completing the cube, there is a total of 24 surfaces. If each edge or plane was then halved into two different notes, top and bottom and side-to- side, there would be a grand total of 48 notes or 48 available hitting surfaces. Each surface can be halved into inner quadrants or inside/outside surfaces, so there could be a total of 96 different tones available to play at one given time. Now imagine if this unit was interfaced/connected with a drum brain module and Midi FX unit, the XILO cube would have the ability to create hundreds if not thousands of different tones and effects, either musically or percussively. The XILO CUBE takes the one-dimensional horizontal flat electronic drum pad unit and expands it into a 3-D cube able to be played from any angle.

CONFIGURATION OPTIONS

#1 The Organic Analog Lo-Fi Industrial XILO CUBE Model

Four different surfaces of an open square fitted with four different tones or note tubes (fitted semi-loosely around each post for exponential rattle, closed with a snapping clasp) (perhaps E GB D or A C F G) on each side (or bar, post) with the adjoining square (possibly smaller such as a 12" and an 8") or rear square begins to create the cube. Using musical notes, the effect would be similar to a steel drum in cubic form.

Eight surfaces available to be played at one time. The effects can be mesmerizing utilizing only half the hand effort to double or quadruple the hits.

The XILO can be employed as an independent musical percussion station or as a perfect accompaniment or augmentation to an existing drum kit, acting as a hi-hat or ride cymbal substitute or addition.

On the Analog XILO cuber embodiment, different toned and textured pipes (tubes, sleeves) would be fitted onto each square of the cube with individual clasps allowing loose extra space between tube and bar for exponential notes and extra play, now including the squares on either side and above and below equaling 24 surfaces. The XILO Cube would have a lightweight stand adjusting to all heights and angles with a sturdy and malleable goose neck to hold the XILO in place at the desired angle and to be able to manipulate at any desired angle or direction, like a hi-hat or an overhead hanging cymbal or a ride cymbal to the side, on either side of the drum kit (perhaps two XILOs) or stationed like any exotic cymbal setup. Options would be available to switch out different tubes and tones with different textures and notes able to be taken off and replaced by four different tones or notes which could be included in the package or purchased separately.

#2 XILO Electronic Digital Model

Same configuration of adjoining squares equaling a cube, same stand, same gooseneck but with Midi pads/surfaces on each side of the squares controlled by a drum brain module/sequencer/loop station. If the outsides and insides of each square were fitted with a separate pad/surface, the ability to have sixteen (16) surfaces instead of only eight (8) would be the new reality. Run through a brain module housing hundreds or even thousands of samples, textures, tones, and notes, the variations would be literally infinite and dizzying yet the ultimate imagination challenge for any percussionist or drummer of any skill level.

In fact the playing configuration of the XILO adds a "third hand" element to any player multiplying hits with half the effort, giving even a beginning drummer the ability to sound more complex and to create more notes with half the effort. This is what makes the XILO cube unique is the simple kinetic technique to getting all the extra notes without the extra action. The essential technique is very basic and simple to learn. Once learned, the percussive apex is without limits. The variations of added individual techniques only creates a stellar exponentiality to the XILO instrument.

The pad surfaces would be soft or hard rubber like those of established drum triggers or pads but a more astringent surface resembling a metal pipe or small sheets of metal (or fitted tubes) would hold a more organic and industrial feel and stick attack. Both surfaces are possible options.

With a built-in effects unit into the drum brain module could vary every single hit into flanges, echoes, delays etc. into giving every single hit its own epic significance or simplicity. The decays and length and/or frequency/speed of delays would all be included in the brain module. Perhaps a partnering would be in order. The loop station could be included into the XILO brain module or perhaps purchased separately from a different company altogether as an additional effects unit as most guitarists use multiple effects units cabled together on a foot pedal board. The XILO brain module would then be paired with a speaker, monitor, amplifier, or microphone to expound the sound. The XILO brain module options would include an equalizer and pitch modulator as well as volume control plus recording capabilities.

Used as an independent percussion station, the XILO has the ability to be a one-man or one-woman show unto itself or to be played within a band as a separate instrument altogether as a multi-percussionist might do with a conga, chimes, cymbal, and timbale set-up.

#3. Maximum XILO Model

Using every side of the entire hexahedron, enables the utilization of twenty-four (24) playing surfaces—halving or dividing those surfaces into two surfaces per side creates forty-eight (48) hitting points at one time. Doubling the capacity by using tops and bottoms of each side would create the potential for up to ninety-six (96) surfaces.

A combination of analog and digital sound surfaces would be included in this model.

With the assistance of the versatile and flexible gooseneck stand and attachment, it is simple to switch positions easily with the XILO, even in the midst of playing, not unlike Rototoms. Angles can be altered effortlessly between songs and during songs while swiveling the cube to create dominant surface equations or secondary sound sequences.

In one embodiment, the materials would consist of glossy black lightweight metal and/or black rubber in the case of pads or trigger bars; black or silver metal in the case of the analog cuff option or a combination of both.

The variable to a XILO unit without a built-in metal stand would be the stand-alone gooseneck and a metal clamp that would grasp or clasp onto any conventional cymbal stand or drum mount giving it the ability to be placed and twisted anywhere in the context of a traditional drum kit.

The dimensions of the cube would either be 8" or 12" or even 16" with an option of a larger front square (12-16") and a rear square (12-8"). The options of larger front square and dimensionally smaller rear square are being considered while the equilateral cube is currently being considered as more favorable for playing logistics.

For purposes of this document, reference in the specification to "an embodiment," "one embodiment," "some embodiments," or "another embodiment" may be used to describe different embodiments or the same embodiment.

The XILO cube is a percussion instrument based on the classic Euclidean (hexahedronic) open-sided cube. Manufactured of lightweight metal, each edge/side of the cube contains a different note and/or tone giving it 24 (twenty-four) playing surfaces. All edges are spot-welded.

Figure 2:
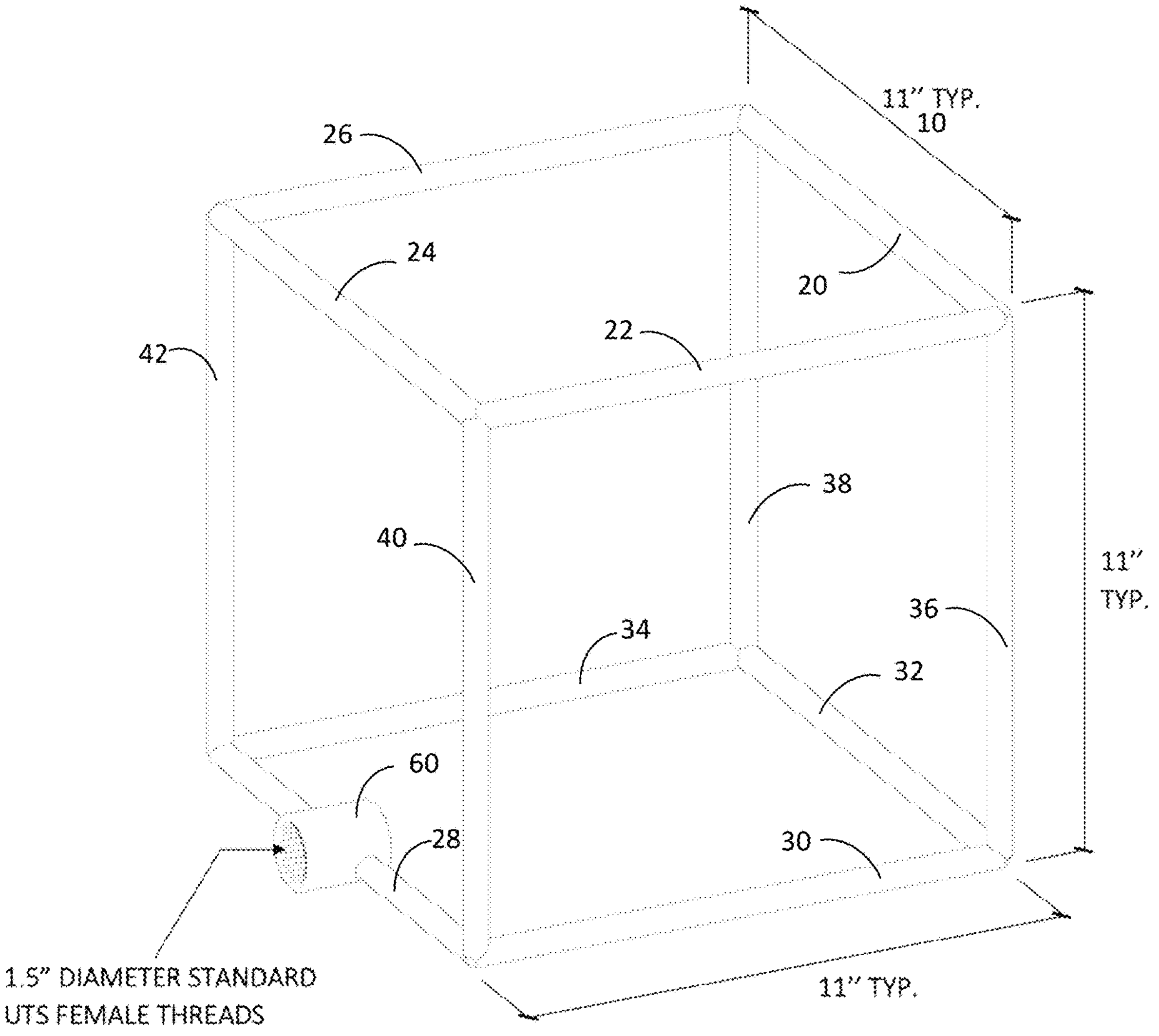
FIG. 2 depicts the XILO cube.
Figure 3:
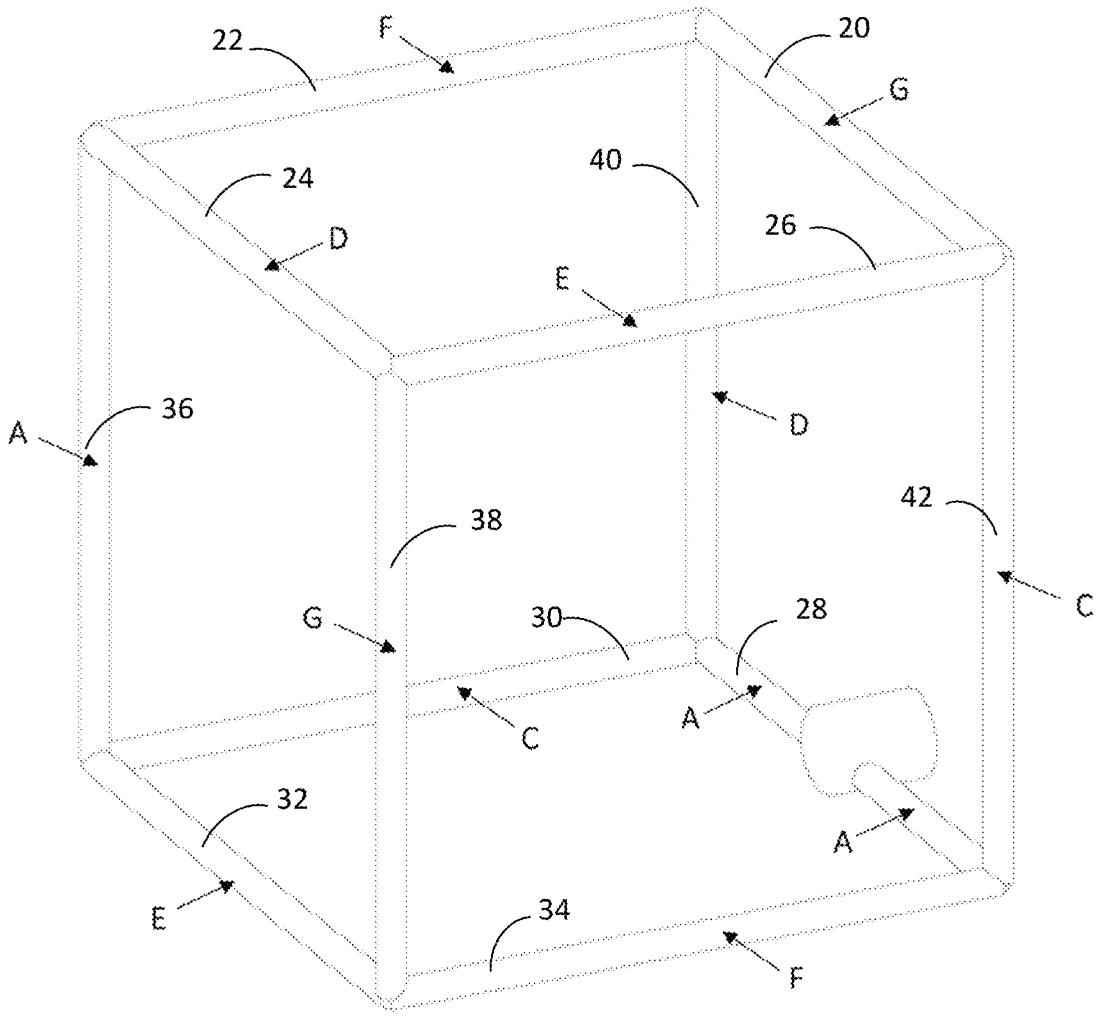
FIG. 3 depicts the XILO cube.

FIGS. 1-3 depict one example embodiment of the XILO cube 10 on a 2' firm gooseneck stand 12 connected from the posterior horizontal lower edge of the cube with a welded bracket with a male connector 62 of gooseneck stand 12 screwed into female connector 60 of the XILO cube 10. Gooseneck stand 12 leads down into a metal three-legged stand (not depicted) with the ability to modify height. With the extended stand and the attached gooseneck, the XILO Cube could attain a height of 6' or more with the ability to move and rotate in all directions. The welded bracket and fixture can also allow the cube to be maneuvered in all directions depending upon the tightness.

The trio of components allows for versatility and location of the instrument making it possible to 1) snake into the context of a traditional drum set between drums and cymbals or straight over the top in an arc, 2) a complement to an independent percussion station, or 3) as a stand-alone performance instrument.

The ability to amplify the instrument would be accessible to a microphone using a customized two-sided plastic clip underneath the cube attached to the gooseneck. The clip would be adaptable to accommodate a range of different microphone sizes and fit specifically to the gooseneck (to be included with the product).

The unit is designed to be an acoustic instrument but the options to amplify it are many—a separate club overhead microphone for live performances or (attached to the gooseneck) run directly through a PA system or linked to a microphone through a loop station or sound effects modulation box in conjunction with a guitar amplifier.

It is a possibility that as the XILO Cube is developed, to partner with an electronic sound effects box company to include a custom effects unit as it pertains directly to the instrument (i.e., Latin, Industrial, Rock, Space, or traditional classical xylophonic or piano textures). The unit may be included with the XILO Cube or purchased separately (to be determined as a different patent).

In one embodiment, the XILO Cube itself will be 11" X 11" equilaterally on each edge of the cube (see FIG. 2).

Each edge (bar, side, or tube) will either be either hollow or solid, or a combination of both as Research and Development dictates. The material used for the edges will be either steel, carbon steel or stainless steel, not unlike the traditional steel drums or hand pans originally developed in Trinidad and Tobago, now manufactured around the world. FIGS. 1-3 show twelve edges: 20, 22, 24, 26, 28, 30, 32, 34, 36, 38, 40 and 42. Edges 24, 36, 32 and 38 form the front 80 of the XILO cube 10. Edges 20, 40, 28 and 42 for the back 82 of the XILO cube 10. Female connector 60 (for connecting to the gooseneck stand 12 is mounted on edge 28 at the back 82 of the XILO cube 10. In one embodiment, female connector 60 includes a 1.5 inch diameter threads on the inside surface. The width or circumference of each edge can be approximately ⅛", ¼", ½" , 1" or another value between 1/8"-1". The width/diameter of the edges may vary in size from side to side to achieve different tones and/or notes. The thickness of the edges (e.g., thickness of the steel in the tubes or bars) may vary in size from side to side to achieve different tones and/or notes. In one embodiment, where the edges are bars, the edges are configured to emit different sounds in response to being struck on top surfaces of the bars as compared to being struck on bottom surfaces of the bars.

In one embodiment, edge options include hollow bars, solid steel bars, solid steel surrounded by a hollow steel cuff, thin rubber circular bands of rubber surrounded by a larger hollow steel cylinder, or a combination of two or three of the edge material options stated above. In one embodiment, the edges are spot welded together. In one embodiment, the edges are attached at every corner with plastic or rubber grommets as opposed to spot welds. In one embodiment, the edges 20-42 are of equal length.

FIG. 3 depicts one example embodiment of assigning musical notes to the edges 20-42. For example, edges 28/36 are A, edges 30/42 are C, edges 24/40 are D, edges 26/32 are E, edges 22/34 are F and edges 20 and 38 are G. Tones are configured in 4ths. Piano segments are equal to 1-2-½-3-⅔-4-¾-4/1.

The XILO Cube is based on the traditional principle of the Idiophone or musical Triangle yet is expanded into a cube. While the Triangle contains three different sides, the XILO Cube produces 24 different surfaces, 24 different notes and indefinite pitches. The combination of notes is as infinite of that of a Xylophone.

The playing techniques with the XILO Cube are what sets this musical instrument apart from any other. Single notes can be turned into double notes with the same amount of effort using the bottom and top edges or side-to-side. Using two sticks, a double stroke roll transforms into four notes. Using three sides in a triangular pattern with one stick, the same effect can be achieved with that of a Triangle except using three distinctly different notes. Using a circular pattern within any one of the open-sided squares, quadruplets can achieved using one hand. Using one hand hitting the front and back squares increases the amount of notes even more. These variations in conjunction with a second hand, the musical possibilities increase exponentially.

One embodiment includes a percussion musical instrument, comprising: twelve metal edges connected together to form a three dimensional cube, each edge is configured to emit a musical note in response to being struck.

One example implementation further comprises a connector attached to at least one of the edges for connecting the musical instrument to a stand.

One example implementation further comprises a connector with female threads attached to posterior horizontal lower edge of the cube for connecting the musical instrument to a stand.

In one example implementation, the twelve metal edges form a hexahedron.

In one example implementation, the twelve metal edges are of equal length and form a hexahedron.

In one example implementation, the twelve metal edges are hollow.

In one example implementation, the twelve metal edges are solid.

In one example implementation, the twelve metal edges are hollow steel bars.

In one example implementation, the edges are configured to emit different sounds in response to being struck on top surfaces of the bars as compared to being struck on bottom surfaces of the bars.

In one example implementation, the twelve metal edges are tubes.

In one example implementation, the twelve metal edges are steel.

In one example implementation, widths or diameters of the edges may vary from edge to edge to achieve different notes for different edges.

In one example implementation, thickness of the edges may vary from edge to edge to achieve different notes for different edges.

In one example implementation, the edges are each a thin circular band of rubber surrounded by a larger hollow steel cylinder.

In one example implementation, the edges are spot welded together.

In one example implementation, the edges are connected together by grommets at corners of the cube.

In one example implementation, each edge is configured to emit a tone in response to being struck, the tones are configured in 4ths.

In one example implementation, two of the edges are configured to emit musical note A in response to being struck; two of the edges are configured to emit musical note C in response to being struck; two of the edges are configured to emit musical note D in response to being struck; two of the edges are configured to emit musical note E in response to being struck; two of the edges are configured to emit musical note F in response to being struck; and two of the edges are configured to emit musical note G in response to being struck.

One embodiment includes a percussion musical instrument, comprising: twelve edges connected together to form a hexahedron, each edge is configured to emit a musical note in response to being struck.

One embodiment includes a percussion musical instrument, comprising: twelve hollow steel bars of equal length spot welded together to form a hexahedron, each edge is configured to emit a musical note in response to being struck, the hexahedron having a front and a back, the twelve hollow steel bars are configured to emit at least six different notes; and a connector with female threads attached to at least one of the edges at the front of the hexahedron for connecting the musical instrument to a stand.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A percussion musical instrument, comprising:
twelve metal edges connected together to form a three dimensional cube, each edge is configured to emit a musical note in response to being struck.

2. The percussion musical instrument of claim 1, further comprising:
a connector attached to at least one of the edges for connecting the musical instrument to a stand.

3. The percussion musical instrument of claim 1, further comprising:
a connector with female threads attached to posterior horizontal lower edge of the cube for connecting the musical instrument to a stand.

4. The percussion musical instrument of claim 1, wherein:
the twelve metal edges form a hexahedron.

5. The percussion musical instrument of claim 1, wherein: the twelve metal edges are of equal length and form a hexahedron.

6. The percussion musical instrument of claim 1, wherein: the twelve metal edges are hollow.

7. The percussion musical instrument of claim 1, wherein: the twelve metal edges are solid.

8. The percussion musical instrument of claim 1, wherein: the twelve metal edges are hollow steel bars.

9. The percussion musical instrument of claim 8, wherein: the edges are configured to emit different sounds in response to being struck on top surfaces of the bars as compared to being struck on bottom surfaces of the bars.

10. The percussion musical instrument of claim 1, wherein: the twelve metal edges are tubes.

11. The percussion musical instrument of claim 1, wherein: the twelve metal edges are steel.

12. The percussion musical instrument of claim 1, wherein: widths or diameters of the edges may vary from edge to edge to achieve different notes for different edges.

13. The percussion musical instrument of claim 1, wherein: thickness of the edges may vary from edge to edge to achieve different notes for different edges.

14. The percussion musical instrument of claim 1, wherein: the edges are each a thin circular band of rubber surrounded by a larger hollow steel cylinder.

15. The percussion musical instrument of claim 1, wherein: the edges are spot welded together.

16. The percussion musical instrument of claim 1, wherein: the edges are connected together by grommets at corners of the cube.

17. The percussion musical instrument of claim 1, wherein: each edge is configured to emit a tone in response to being struck, the tones are configured in 4ths.

18. The percussion musical instrument of claim 1, wherein:
two of the edges are configured to emit musical note A in response to being struck;
two of the edges are configured to emit musical note C in response to being struck;
two of the edges are configured to emit musical note D in response to being struck;
two of the edges are configured to emit musical note E in response to being struck;
two of the edges are configured to emit musical note F in response to being struck; and
two of the edges are configured to emit musical note G in response to being struck.

19. A percussion musical instrument, comprising: twelve edges connected together to form a hexahedron, each edge is configured to emit a musical note in response to being struck.

20. A percussion musical instrument, comprising:
twelve hollow steel bars of equal length spot welded together to form a hexahedron, each edge is configured to emit a musical note in response to being struck, the hexahedron having a front and a back, the twelve hollow steel bars are configured to emit at least six different musical notes; and
a connector attached to at least one of the edges at the front of the hexahedron for connecting the musical instrument to a stand.

* * * * *